Patented Oct. 23, 1928.

1,688,837

UNITED STATES PATENT OFFICE.

KARL STIEGER, OF GRAZ, AUSTRIA, ASSIGNOR TO FELICE BENSA, OF GENOA, ITALY.

PROCESS OF MANUFACTURING DINITRO DERIVATIVES OF PERYLENE AND ITS COMPOUNDS.

No Drawing. Application filed January 5, 1926, Serial No. 79,477, and in Austria October 28, 1925.

The nitration of perylene leads, according to the conditions used in the reaction to derivatives of different degrees of nitration. In preparing nitroperylene by the usual method consisting in treating the starting material with nitric acid, besides the nitroperylenes considerable quantities of hydroxy-derivatives are formed which render difficult the purification and reduce the output. Moreover part of the perylene is destroyed. This is more particularly true in the case of the manufacture of dinitroperylene. Now it has been found, that these objectionable side reactions are completely avoided if a suspension of perylene in glacial acetic acid is subjected at a temperature near its point of ebullition to the action of a calculated quantity of nitric acid produced in situ. The best way of realizing this, is to introduce into the suspension a quantity of a nitrate, preferably potassium nitrate, corresponding to the quantity of nitric acid and, while stirring continuously adding thereto a quantity of sulphuric acid required for decomposing the nitrate, the sulphuric acid being preferably diluted with glacial acetic acid.

*Example.*—1 part by weight of very finely pulverized perylene is suspended in 30 parts by weight of glacial acetic acid. To this suspension a concentrated aqueous solution of nitrate of potassium is added and the whole is heated to 100° centigrade. Then while stirring continuously 0.9 to 1 part by weight of sulphuric acid of 66 Bé. preferably diluted with 5 parts by weight of glacial acetic acid is added drop by drop in the course of an hour. The product of reaction is separated from the liquid after cooling and recrystallized from a solvent such as nitrobenzene. The output in raw product is about 96%. The process is also applicable to perylene halogen derivatives such as perylene dichloride.

The dinitroperylene obtained in accordance with the example crystallizes from nitrobenzene in red lanceolate needles. It is almost insoluble in alcohol, benzene and glacial acetic acid, and in concentrated sulphuric acid it dissolves with a brownish red colour.

What I claim is:

1. A process for manufacturing dinitro derivatives of any one of the compounds selected from the group of perylene and its halides consisting in suspending such compound in glacial acetic acid, heating the suspension to substantially the boiling temperature of water and subjecting the suspension to the action of a quantity of nitric acid produced in situ which gives two molecules of $NO_2$ for each molecule of the said compound.

2. A process for manufacturing dinitro derivatives of any one of the compounds selected from the group of perylene and its halides consisting in suspending such compound in glacial acetic acid, adding to the suspension, a quantity of a concentrated aqueous solution of a nitrate capable of giving two molecules of $NO_2$ for each molecule of the said compound, heating the whole to substantially the boiling temperature of water, and gradually adding sulphuric acid to the whole.

3. A process for manufacturing dinitro derivatives of any one of the compounds selected from the group of perylene and its halides consisting in suspending such compound in glacial acetic acid, adding to the suspension a quantity of a concentrated aqueous solution of a nitrate capable of giving two molecules of $NO_2$ for each molecule of the said compound, heating the whole to substantially the boiling temperature of water and gradually adding under continuous agitation a mixture of concentrated sulphuric acid and glacial acetic acid.

In testimony whereof I affix my signature.

KARL STIEGER.